United States Patent
Wang

(10) Patent No.: US 12,468,558 B2
(45) Date of Patent: Nov. 11, 2025

(54) EXHIBITING METHOD OF DESKTOP ELEMENT AND ELECTRONIC DEVICE

(71) Applicants: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

(72) Inventor: Jiayu Wang, Guangzhou (CN)

(73) Assignees: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/070,788

(22) Filed: Nov. 29, 2022

(65) Prior Publication Data

US 2024/0004675 A1 Jan. 4, 2024

Related U.S. Application Data

(63) Continuation of application No. PCT/CN2022/102864, filed on Jun. 30, 2022.

(51) Int. Cl.
  *G06F 3/048* (2013.01)
  *G06F 3/04845* (2022.01)
  *G06F 9/451* (2018.01)

(52) U.S. Cl.
  CPC .......... *G06F 9/451* (2018.02); *G06F 3/04845* (2013.01)

(58) Field of Classification Search
  CPC ....... G06F 9/451; G06F 3/04845; G06F 3/048
  See application file for complete search history.

(56) References Cited

U.S. PATENT DOCUMENTS 5,704,050 A * 12/1997 Redpath .................. G06F 9/451
                                                       715/764
6,072,486 A * 6/2000 Sheldon ................ G06F 3/0481
                                                       715/835

(Continued)

FOREIGN PATENT DOCUMENTS

CN        104216752 A    12/2014
CN        104714725 A     6/2015

(Continued)

OTHER PUBLICATIONS

Extended European Search Report issued in corresponding European Application No. 22212269.9, mailed May 25, 2023, 98 pages.

(Continued)

*Primary Examiner* — Mahelet Shiberou
(74) *Attorney, Agent, or Firm* — BAYES PLLC

(57) ABSTRACT

An exhibiting method of a desktop element and an electronic device are provided. The exhibiting method of the desktop element is applied to an operating system of the electronic device, a desktop of the operating system includes a desktop element, and the exhibiting method of the desktop element includes: receiving a set-to-top instruction directed at the desktop element; creating a floating-window container for the desktop element according to the set-to-top instruction; moving the desktop element from the desktop to the floating-window container; and locating the desktop element exhibited in the floating-window container on the upper layer of the interface exhibited in the desktop.

20 Claims, 14 Drawing Sheets

(56) References Cited

U.S. PATENT DOCUMENTS

| | | | |
|---|---|---|---|
| 9,395,866 B2* | 7/2016 | Lettau | G06F 3/0481 |
| 10,564,797 B2* | 2/2020 | Jann | G06F 9/451 |
| 11,847,294 B2* | 12/2023 | Lin | G06F 3/0481 |
| 2006/0036946 A1* | 2/2006 | Radtke | G06F 40/166 |
| | | | 715/842 |
| 2007/0044035 A1* | 2/2007 | Amadio | G06F 3/0481 |
| | | | 715/781 |
| 2010/0185944 A1* | 7/2010 | Hosotsubo | G06T 11/60 |
| | | | 715/255 |
| 2013/0227473 A1 | 8/2013 | Corvo | |
| 2014/0237367 A1* | 8/2014 | Jung | G06F 3/04845 |
| | | | 715/728 |
| 2014/0289642 A1* | 9/2014 | Prasad | G06F 3/0482 |
| | | | 715/745 |
| 2017/0199662 A1* | 7/2017 | Xia | G06F 3/04845 |
| 2020/0192683 A1* | 6/2020 | Lin | G06F 9/445 |
| 2021/0157458 A1* | 5/2021 | Simon | G06F 3/0482 |
| 2022/0129117 A1 | 4/2022 | Zhuhai | |
| 2024/0019977 A1* | 1/2024 | Kong | G06F 9/451 |
| 2024/0176473 A1* | 5/2024 | Chen | G06F 3/04842 |

FOREIGN PATENT DOCUMENTS

| | | |
|---|---|---|
| CN | 105938430 A | 9/2016 |
| CN | 106168869 A | 11/2016 |
| CN | 106201632 A | 12/2016 |
| CN | 106873842 A | 6/2017 |
| CN | 106020621 B | 5/2019 |
| CN | 112181225 A | 1/2021 |
| CN | 112214144 A | 1/2021 |
| WO | 2021129326 A1 | 7/2021 |

OTHER PUBLICATIONS

Notice of Preliminary Rejection issued in corresponding Korean application No. 10-2022-7041305, dated Jan. 17, 2025, 16 pages.

* cited by examiner

EXHIBITING METHOD OF DESKTOP ELEMENT AND ELECTRONIC DEVICE

CROSS-REFERENCE TO RELATED APPLICATION

The present application is a continuation of International Application No. PCT/CN2022/102864, filed on Jun. 30, 2022. The entire content of the above-identified application is expressly incorporated herein by reference.

TECHNICAL FIELD

The present disclosure relates to the field of display technology, in particular to an exhibiting method of a desktop element and an electronic device.

BACKGROUND

In some technologies, a desktop of an operating system may include a desktop element. The desktop element is configured to exhibit a desktop object. Thereinto, the desktop object includes but is not limited to an application icon displayed on the desktop and a display interface of a desktop tool (such as a display interface of a desktop weather tool and a display interface of a desktop clock tool). One or more desktop objects can be exhibited in a desktop element.

Generally, the exhibition interface in the desktop is often located on an upper layer of the desktop element, so that when there is an exhibition interface in the desktop, the desktop element may be blocked by the exhibition interface. Currently, when a user needs to view or operate a desktop element, it is necessary to close or minimize the exhibition interface on the desktop, and then return to the desktop interface so as to view or operate the desktop element. Obviously, the operation process of the desktop element in the prior art is cumbersome.

SUMMARY

In view of this, embodiments of the present disclosure provide an exhibiting method of a desktop element and an electronic device, which can simplify a user's operations.

An aspect of the present disclosure provides an exhibiting method of a desktop element, the method is applied to an operating system of an electronic device, and a desktop of the operating system includes a desktop element, the method includes receiving a set-to-top instruction directed at the desktop element; creating a floating-window container for the desktop element according to the set-to-top instruction; moving the desktop element from the desktop to the floating-window container; and locating the desktop element exhibited in the floating-window container on an upper layer of an interface exhibited in the desktop.

In some embodiments, the step of creating the floating-window container for the desktop element includes: determining a desktop coordinate of the desktop element, wherein the desktop coordinate refers to a coordinate position of the desktop element under a grid coordinate system of the desktop, and the grid coordinate system is established based on a grid matrix of the desktop; converting the desktop coordinate of the desktop element into a screen coordinate, wherein the screen coordinate refers to a coordinate position of the desktop element under a screen coordinate system of the desktop, and the screen coordinate system is established based on a screen resolution; and creating the floating-window container in a regional position defined by the screen coordinate.

In some embodiments, after the step of creating the floating-window container, the method further includes: if a floating-window closing instruction is received, removing the desktop element from the floating-window container and restoring the desktop element to the desktop.

In some embodiments, before the step of moving the desktop element from the desktop to the floating-window container, the method further includes: storing a desktop coordinate of the desktop element as an element desktop coordinate; the step of restoring the desktop element to the desktop includes: determining whether there is a content in the regional position defined by the element desktop coordinate, and if not, restoring the desktop element to the regional position defined by the element desktop coordinate.

In some embodiments, the method further includes: if there is a content in the regional position defined by the element desktop coordinate, restoring the desktop element to a free regional position on the desktop.

In some embodiments, after the step of restoring the desktop element to the regional position defined by the element desktop coordinate, the method further includes: if a size of the desktop element is different from that of the regional position defined by the element desktop coordinate, adjusting the size of the desktop element, so that the size of the desktop element matches the size of the regional position defined by the desktop coordinate.

In some embodiments, after the step of moving the desktop element from the desktop to the floating-window container, the method further includes: in response to a floating-window adjusting instruction, adjusting a window size of the floating-window container so as to adjust the size of the desktop element; and/or in response to a window moving instruction, moving the floating-window container from a current region to another region of the desktop so as to exhibit the desktop element in the another region.

In some embodiments, the floating-window container includes a normal display state and a minimization display state, wherein the normal display state refers to a state in which a window of the floating-window container is exhibited on the desktop, and the minimization display state refers to a state in which the floating-window container remains running but the corresponding window is not exhibited on the desktop; after the step of moving the desktop element from the desktop to the floating-window container, the method further includes: when receiving a minimization instruction or detecting that a current interface exhibited in the desktop is a preset interface, adjusting the floating-window container from the normal display state to the minimization display state.

Another aspect of the present disclosure further provides an electronic device, the electronic device is provided with an operating system, and a desktop of the operating system includes a desktop element; the electronic device includes: a touch screen, configured to exhibit the desktop and receive a set-to-top instruction directed at the desktop element; and a processor, configured to create a floating-window container for the desktop element according to the set-to-top instruction, move the desktop element from the desktop to the floating-window container, and locate the desktop element exhibited in the floating-window container on an upper layer of an interface exhibited in the desktop.

Another aspect of the present disclosure further provides an electronic device, the electronic device is connected with a display device, the electronic device is provided with an operating system, a desktop of the operating system includes a desktop element, and a desktop of the operating system is exhibited by the display device; the electronic device includes: a communication module, configured to communicate with the display device and receive a set-to-top instruction directed at the desktop element sent by the display device; and a processor, configured to generate a control instruction according to the set-to-top instruction, send the control instruction to the display device through the communication module so as to control the display device to create a floating-window container for the desktop element, move the desktop element from the desktop to the floating-window container, and locate the desktop element exhibited in the floating-window container on an upper layer of an interface exhibited in the desktop.

Another aspect of the present disclosure further provides an electronic device, the electronic device includes a processor and a memory, the memory is configured to store a computer program, and when the computer program is executed by the processor, the above-mentioned method is realized.

In the technical solution provided by the above embodiments of the present disclosure, based on the set-to-top instruction, the desktop element can be added to the floating-window container, so that the desktop element is displayed on the upper layer of each interface. Thus, the user can operate the desktop element without closing or minimizing other exhibition interfaces on the desktop, which facilitates the user's operations.

BRIEF DESCRIPTION OF THE DRAWINGS

Features and advantages of the present disclosure will be understood by referring to the drawings, which are schematic and should not be understood as limiting the present disclosure. In the drawings.

DETAILED DESCRIPTION

In order to make the objects, technical solutions and advantages of the embodiments of the present disclosure clearer, the technical solutions in the embodiments of the present disclosure will be described in combination with the drawings in the embodiments of the present disclosure hereinafter. The described embodiments are a part of the embodiments of the present disclosure, not all of the embodiments. Based on the embodiments in the present disclosure, all other embodiments obtained by those skilled in the art without making creative labor belong to the claimed scope of the present disclosure.

Figure 1:
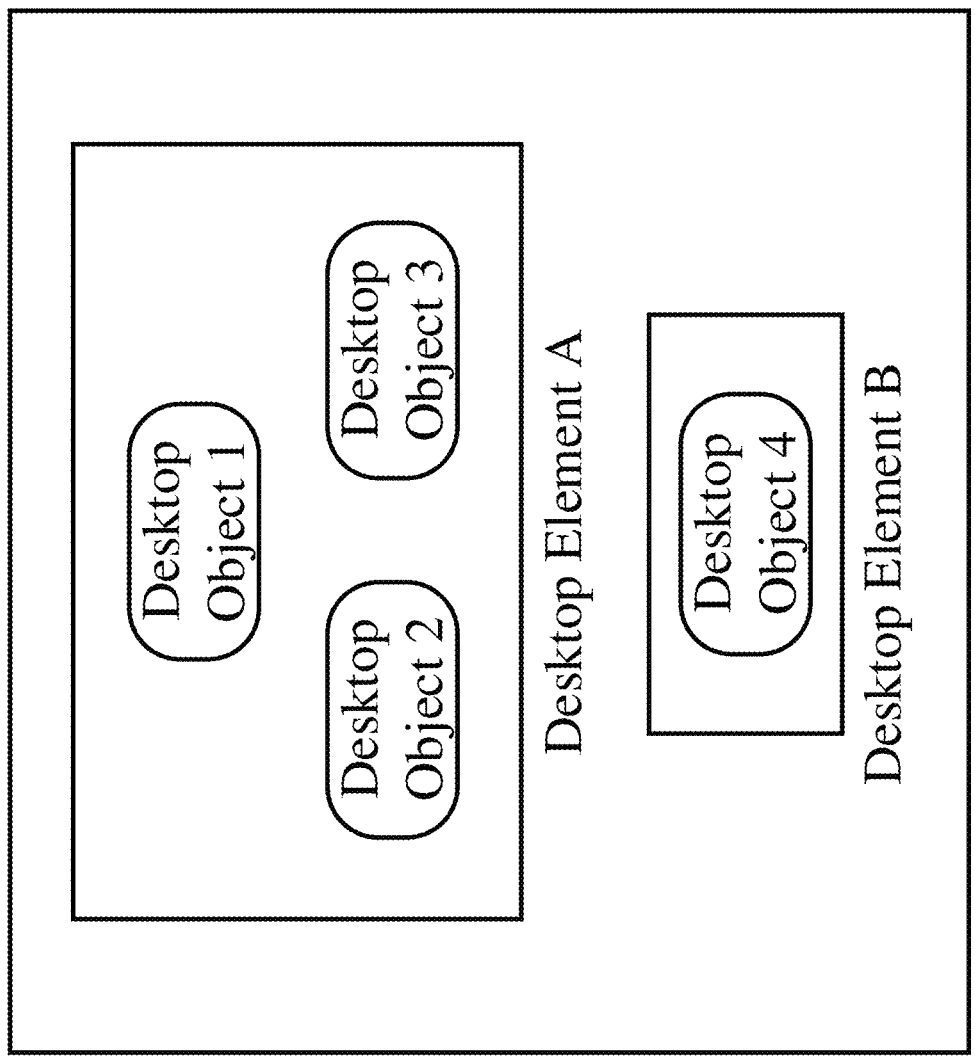
FIG. 1 shows a schematic diagram of desktop elements in a desktop.

In some embodiments of the present disclosure, the desktop element usually exhibits at least one desktop object (such as an exhibition interface of a desktop weather tool and an application startup icon). When the desktop element exhibits a plurality of desktop objects, the desktop element can further be used to define a layout mode of the desktop objects. Referring to FIG. 1 for details, FIG. 1 is a schematic diagram of desktop elements in a desktop. The desktop shown in FIG. 1 includes a desktop element A and a desktop element B. Thereinto, the desktop element A exhibits a desktop object 1, a desktop object 2 and a desktop object 3. And the desktop element defines a layout mode of the desktop object 1, the desktop object 2 and the desktop object 3. The desktop element B exhibits a desktop object 4. When operating the desktop elements, the desktop objects exhibited by the desktop elements are operated at the same time. For example, when the desktop element A in FIG. 1 is moved, all the desktop objects included in the desktop element A are moved at the same time.

Generally, desktop elements can be divided into two types. One type of them may be desktop elements provided by a desktop process, such as a desktop element including one or more application icons. Functions of such desktop elements are provided by the desktop process. The desktop process can actively operate and control such desktop elements. The other type of them is desktop elements registered in the desktop process by other element processes and displayed on the desktop. Functions of such desktop elements are provided by the element processes and have no direct relationship with the desktop process. The desktop process can operate and control the desktop elements according to information provided by the element processes. For example, if an element process corresponding to the desktop element B in FIG. 1 is an element process B, and the element process B needs to update a display color of the desktop element B to blue, the element process B can send blue information to the desktop process, and the desktop process updates the display color of the desktop element B to blue according to blue information sent by the element process B.

Currently, when the user exhibits a content on the desktop, if he wants to view or operate a desktop element on the desktop, the user needs to close or minimize the content exhibiting interface, and then enter the desktop interface so as to view or operate the desktop elements. For example, when performing PPT exhibition on a display screen of an interactive white board, if the user wants to operate the desktop elements on the desktop, it is necessary to close or minimize the PPT first, and then operate the desktop elements on the desktop interface. This situation leads to cumbersome process when viewing or operating desktop elements and inconvenient the user's operations. In addition, screen sizes of some electronic devices are relatively large, which can reach 65 inches to 98 inches, which may cause inconvenience when the user closes or minimizes the content exhibiting interface. For example, in a case where a key for closing or minimizing the content exhibiting interface is on a right side of a display screen, but the user is on a left side of the display screen, the user needs to move from the left side of the display screen to the right side of the display screen in order to close or minimize the content exhibiting interface and view or operate the desktop elements. Thus, this causes inconvenient the user's operations.

For this reasons, the present disclosure provides an exhibiting method of a desktop element, which can be applied to an operating system of an electronic device, and a desktop of the operating system includes a desktop element. Thereinto, the electronic device may include interactive white boards, audio devices, desktop computers, notebooks, intelligent phones, intelligent wearable devices (virtual reality glasses, intelligent watches, etc.) and the like.

Figure 2:
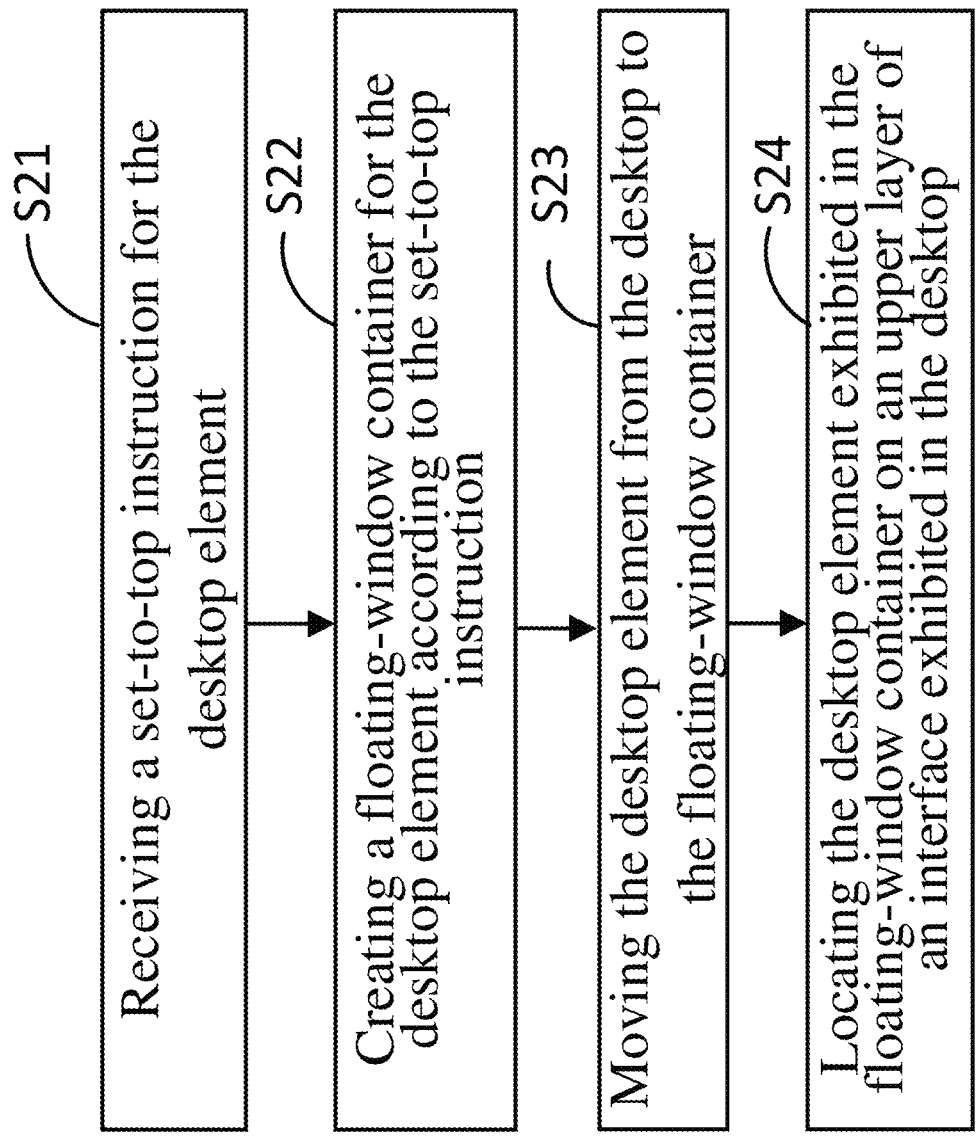
FIG. 2 shows a flowchart of an exhibiting method of a desktop element provided by an embodiment of the present disclosure.

Referring to FIG. 2, FIG. 2 is a flowchart of an exhibiting method of a desktop element provided by an embodiment of the present disclosure. The exhibiting method of the desktop element includes Steps S21 to S24.

Step S21, receiving a set-to-top instruction directed at the desktop element.

In some embodiments, before the content is exhibited on the desktop (for example, before the PPT is exhibited on the desktop), in order to prevent an exhibited content from blocking a desktop element, the user may call out a menu list corresponding to a desktop element by selecting the desktop element in advance through a way of touch, long-pressing selection, or the like, and then select a set-to-top option in the menu list. Thus, the set-to-top instruction can be sent to the interactive white board. The set-to-top instruction can be used to control the interactive white board to display the selected desktop element on an upper layer of the desktop (i.e., above other interfaces in the desktop).

It can be understood that the above is only one of the ways to send the set-to-top instruction, which does not constitute a limitation on the present disclosure. For example, in some embodiments, the display interface of the interactive white board may include a set-to-top button. After selecting the desktop element, the user can send the set-to-top instruction to the interactive white board by touching the set-to-top button, and control the interactive white board to display the selected desktop element on the upper layer of the desktop.

Step S22, creating a floating-window container for the desktop element according to the set-to-top instruction.

In some embodiments, the floating-window container may refer to a container for accommodating desktop elements. That is, the desktop elements are placed in the floating-window container and exhibited on the desktop.

In some embodiments, it is considered that an operating system, such as an Android operating system, is provided with a software development kit. The software development kit can provide a functional interface for creating a floating window. Therefore, when creating a floating-window container for a desktop element, the functional interface of the operating system may be invoked for creation. Thus, the amount of code development can be reduced. Definitely, it can be understood that the exhibiting method of the desktop element according to the present disclosure also supports creation of a floating-window container through other methods. For example, when the software development kit of the operating system does not provide a functional interface for creating a floating window, a self-developed software program can be run to create a floating-window container. The present disclosure does not limit the creation method of the floating-window container.

Hereinafter, a creation process of a floating-window container in an embodiment is taken as an example.

Figure 3:
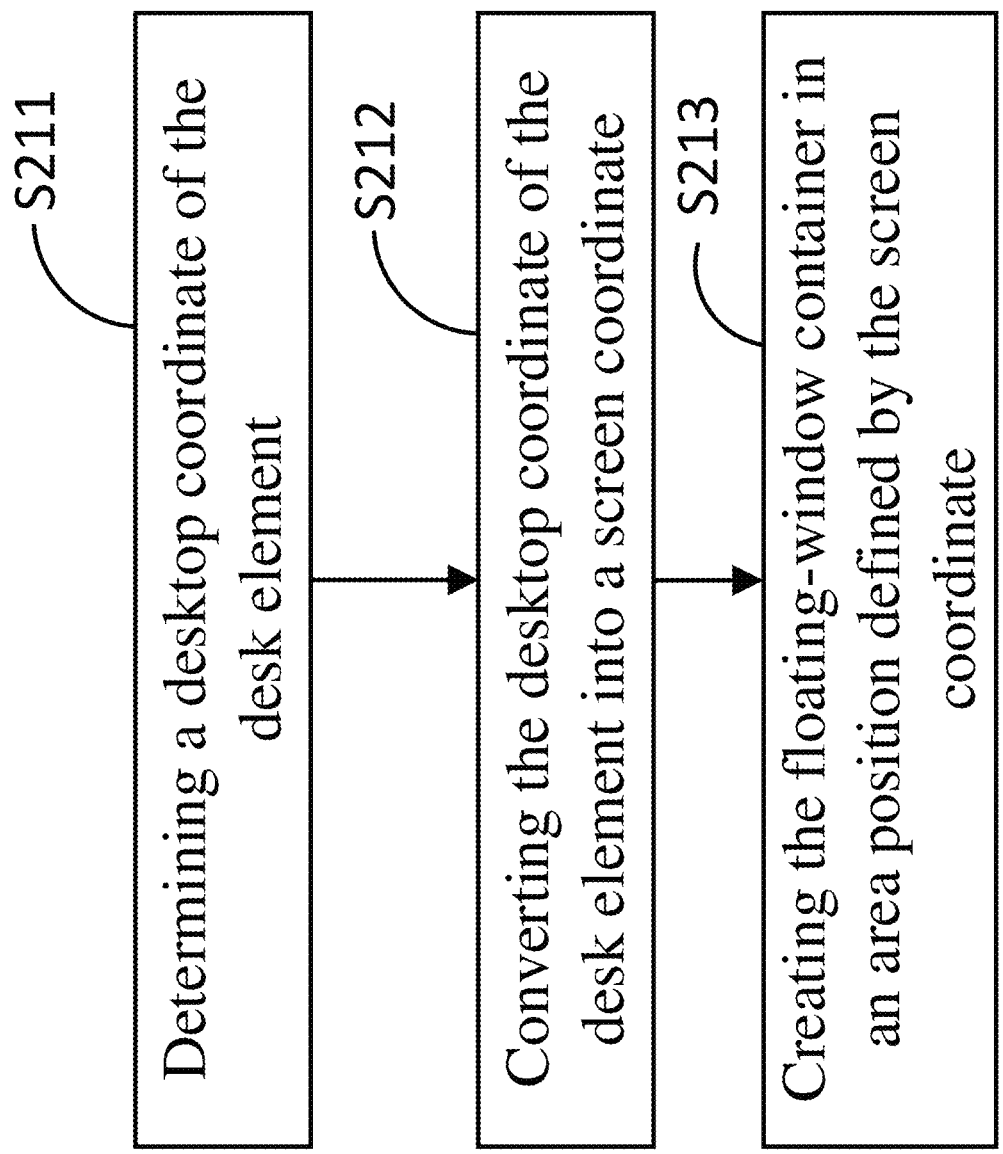
FIG. 3 shows a flowchart of creating a floating-window container provided by an embodiment of the present disclosure.

Referring to FIG. 3, the step of creating the floating-window container for the desktop element may include Steps S211 to S213.

Step S211, determining a desktop coordinate of the desktop element. The desktop coordinate refers to a coordinate position of the desktop element under a grid coordinate system of the desktop, and the grid coordinate system is established based on a grid matrix of the desktop.

Figure 4:
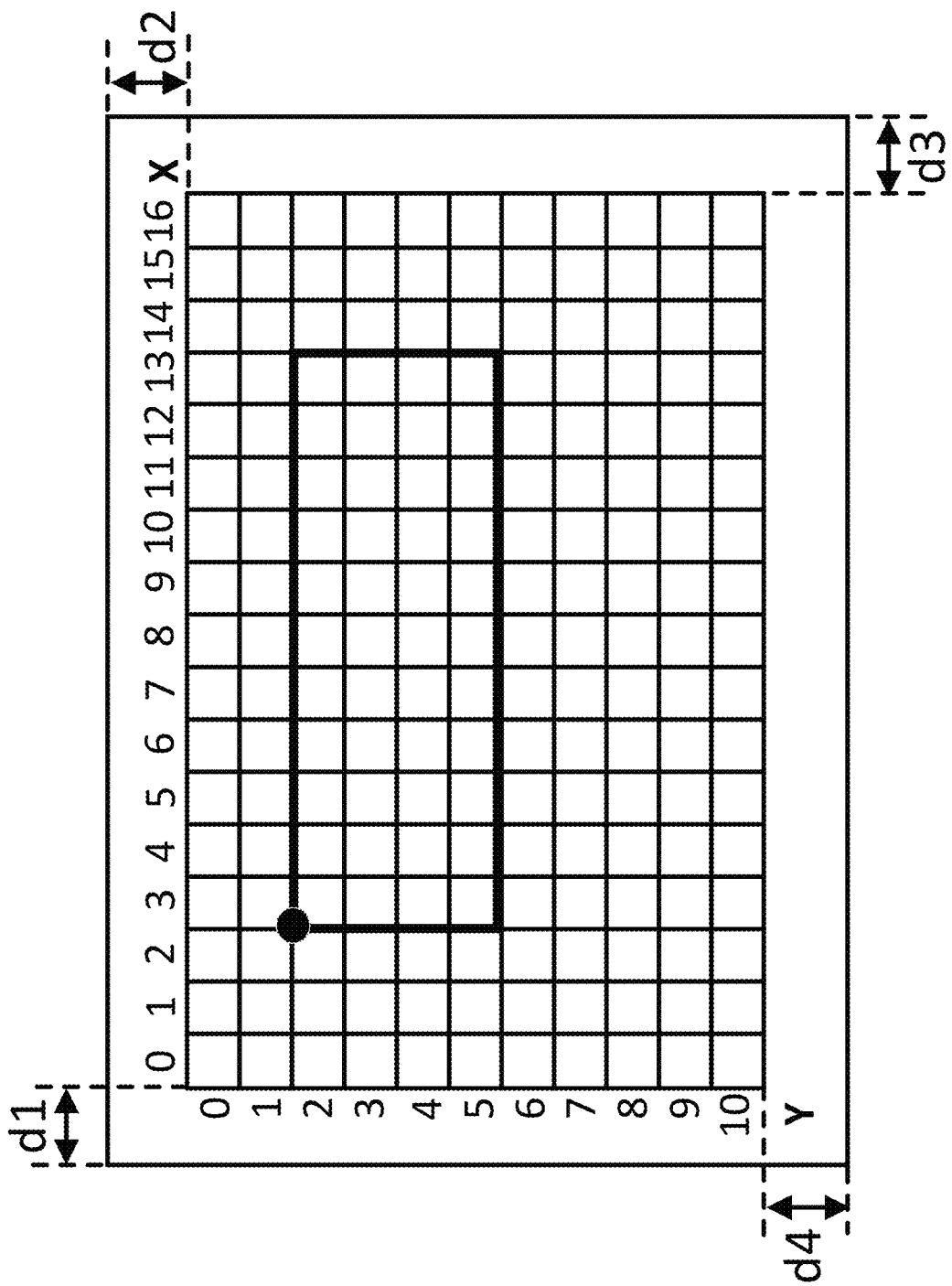
FIG. 4 shows a schematic diagram of a desktop under a grid coordinate system provided by an embodiment of the present disclosure.

Firstly, the grid coordinate system will be described. Referring to FIG. 4, FIG. 4 is a schematic diagram of a desktop under a grid coordinate system provided by an embodiment of the present disclosure. As for the grid coordinate system, it may refer to a grid matrix dividing a desktop into m*n. Distances between the grid matrix and edges of the desktop are d1, d2, d3 and d4, respectively. A grid in an upper left corner of the grid matrix is taken as a grid with a coordinate of (0, 0), and the coordinate system is obtained by performing coordinate coding from the grid to the right and downward in sequence. Thereinto, m and n are integers greater than or equal to 1, respectively. For example, in FIG. 4, the value of m is 16, and the value of n is 10. The above-mentioned d1, d2, d3 and d4 are numerical values greater than or equal to 0.

In FIG. 4, a direction along X may be a width direction under the grid coordinate system, and a direction along Y may be a height direction under the grid coordinate system. A desktop element occupies at least one grid and at most m*n grids. An upper left corner of the desktop element can be an origin of the desktop element. A desktop coordinate of the desktop element may include an origin coordinate, a width and a height of the desktop element under the grid coordinate system. Thereinto, the width refers to the number of grids occupied by the desktop element in the width direction of the grid coordinate system, and the height refers to the number of grids occupied by the desktop element in the height direction of the grid coordinate system. Generally, the width and height are integers greater than or equal to 1, that is, the desktop elements are exhibited on the desktop with the grid as a minimum unit.

Based on the above-mentioned, assuming that an region where a black bold box in FIG. 4 is located is a regional position of a desktop element under the grid coordinate system, an origin coordinate of the desktop element under the grid coordinate system is (x, y), the width is width, and the height is height, then it can be seen from FIG. 4 that a value of x is 2, a value of y is 1, the value of width is 11, and the value of height is 4. In this way, a regional position of a desktop element on the desktop can be defined.

Step S212, converting the desktop coordinate of the desktop element into a screen coordinate. The screen coordinate refers to a coordinate position of a desktop element under a screen coordinate system of the desktop, and the screen coordinate system is established based on a screen resolution.

In some embodiments, converting the desktop coordinate of the desktop element container into the screen coordinate may mainly refer to converting a coordinate determined based on the grid coordinate system into a coordinate determined based on the screen resolution. Hereinafter, an example will be taken for description.

Sequentially, referring to FIG. 4, it is assumed that: under the grid coordinate system in FIG. 4, d1, d2, d3, and d4 are 0 respectively, the number of grids in the width direction is 16, and the number of grids in the height direction is 10; a screen resolution of the display screen is 3840 px*2160 px, an origin coordinate of the desktop element under the screen coordinate system is (x1, y1), the width is width1, and the height is high1.

Based on the above assumptions, calculation is performed according to the screen resolution, the width of a single grid under the grid coordinate system is 3840/16=240 px, and the height is 2160/10=216 px. On this basis, it is further known that:

$$x1=x*240 \text{ px}=2*240 \text{ px}=480 \text{ px}$$

$$y1=y*216 \text{ px}=1*216 \text{ px}=216 \text{ px},$$

$$width1=width*240 \text{ px}=4*240 \text{ px}=960 \text{ px}$$

$$height1=height*216 \text{ px}=2*216 \text{ px}=432 \text{ px}$$

In this way, the screen coordinate of the desktop element can be obtained.

Step S213: creating the floating-window container in a regional position defined by the screen coordinate.

In some embodiments, the size of the floating-window container is the same as that of the regional position defined by the screen coordinate. In other embodiments, the size of the floating-window container may be smaller than that of the regional position defined by the screen coordinate.

It can be understood that a flow of creating a floating-window container in FIG. 3 is only an exemplary flow, which does not constitute a limitation to the present disclosure. For example, in some embodiments, if a coordinate of the desktop element are determined based on the screen coordinate system, Step S211 and Step S212 may not be included in the above flow of creating the floating-window container. In another embodiment, the floating-window container may be created based on the desktop coordinate of the desktop element, then Step S212 may not be included in the above flow of creating the floating-window container, and in Step S213, the floating-window container may be created at the regional position defined by the desktop coordinate.

It can also be understood that in FIG. 3, the step of creating the floating-window container in the region where the desktop element is located is also an exemplary creating method. The floating-window container may not be created in the regional position where the desktop element is located, for example, the floating-window container may be created in an region at an upper right corner or a side edge of the display screen. The present disclosure does not limit the creating position of the floating-window container.

Step S23: moving the desktop element from the desktop to the floating-window container.

In some embodiments, after the floating-window container is created, the desktop element can be selected and moved to the floating-window container by dragging.

In other embodiments, in a case where the floating-window container is created by the way of selecting desktop element through touch or long press, the selected desktop element through touch or long press can be automatically moved to the floating-window container after the floating-window container is created.

Step S24, locating the desktop element exhibited in the floating-window container on an upper layer of an interface exhibited in the desktop.

In some embodiments, the floating-window container may be a container with the following characteristics: for an interface exhibited in the desktop, the floating-window container may be located on the upper layer of each interface. Thereinto, the interface exhibited in the desktop includes an interface currently exhibited through the desktop, and an interface opened in the desktop after the floating-window container is created. The fact that the floating-window container is located on the upper layer of each interface may mean that the floating-window container has the characteristic of not being blocked by other interfaces on the desktop, that is, it is located on the upper layer of these interfaces. In this way, the desktop element exhibited in the floating-window container can be located on the upper layer of the interface exhibited in the desktop.

In some embodiments, in a case where there are a plurality of floating-window containers (for example, floating-window containers are created for a plurality of desktop elements), a newly added floating-window container may be located above the level of other created floating-window containers according to the sequence of creating the floating-window containers. Or, a plurality of floating-window containers may be displayed in parallel (that is, they do not block each other).

In some embodiments of the present disclosure, based on the set-to-top instruction, the desktop element can be added to the floating-window container, so that the desktop element is displayed on the upper layer of each interface. In this way, the user can operate the desktop element without closing or minimizing other exhibition interfaces on the desktop, which facilitates the user's operations.

Hereinafter, the method of the present disclosure will be further described.

In some embodiments, after the desktop element is exhibited through the floating-window container, the floating-window container can be moved from the current region to another region of the desktop in response to a window moving instruction, so as to exhibit the desktop element in another region. Thereinto, the window moving instruction may be generated under any of the following circumstances:

sensing a movement gesture for the floating-window container on the display screen, and according to the regional position of the floating-window container and the regional position of the current exhibition interface in the desktop, determining that the selected floating-window container is located in the region of the current exhibition interface.

Figure 5:
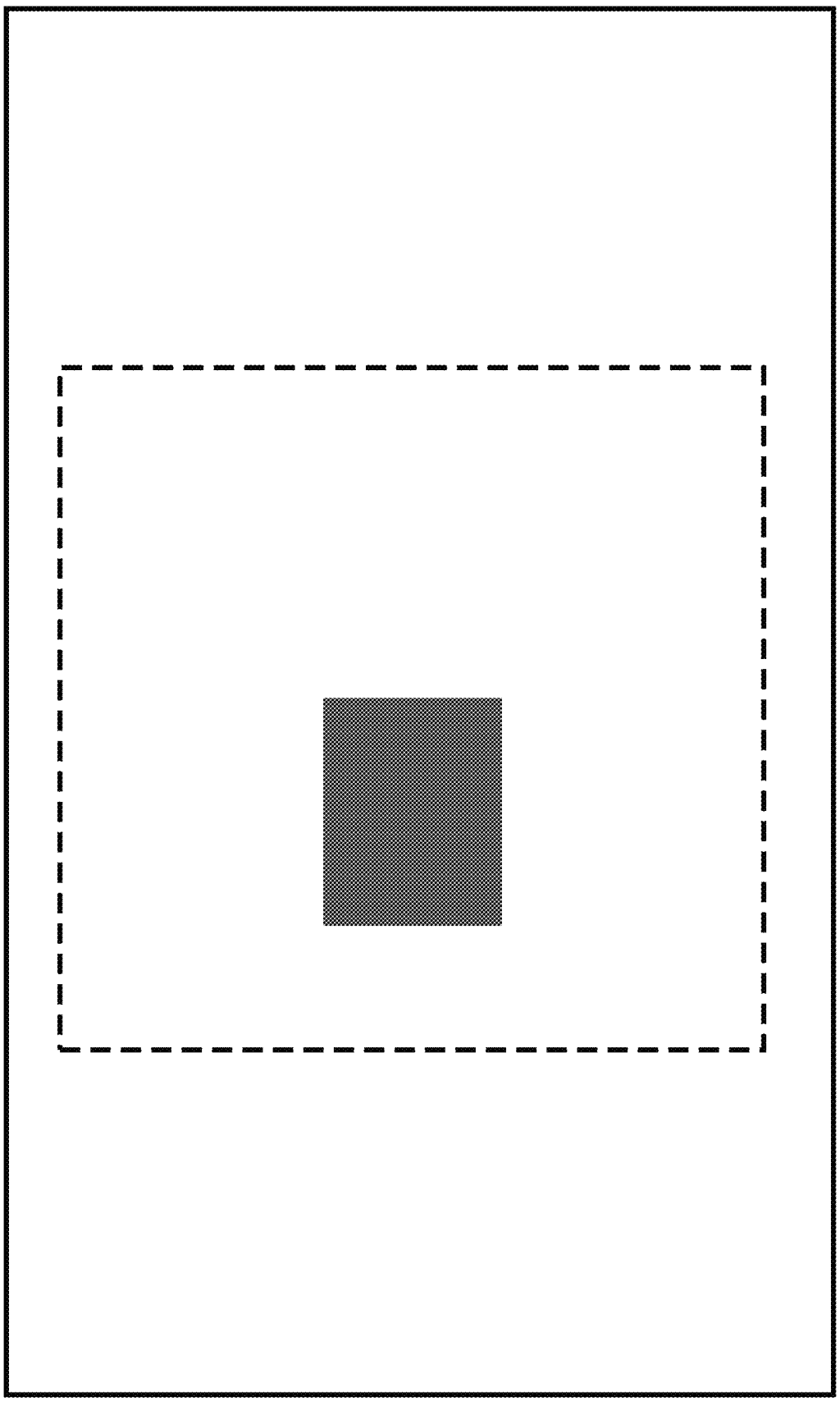
FIG. 5 shows a schematic diagram of a desktop including a floating-window container provided by an embodiment of the present disclosure in a state.
Figure 6:
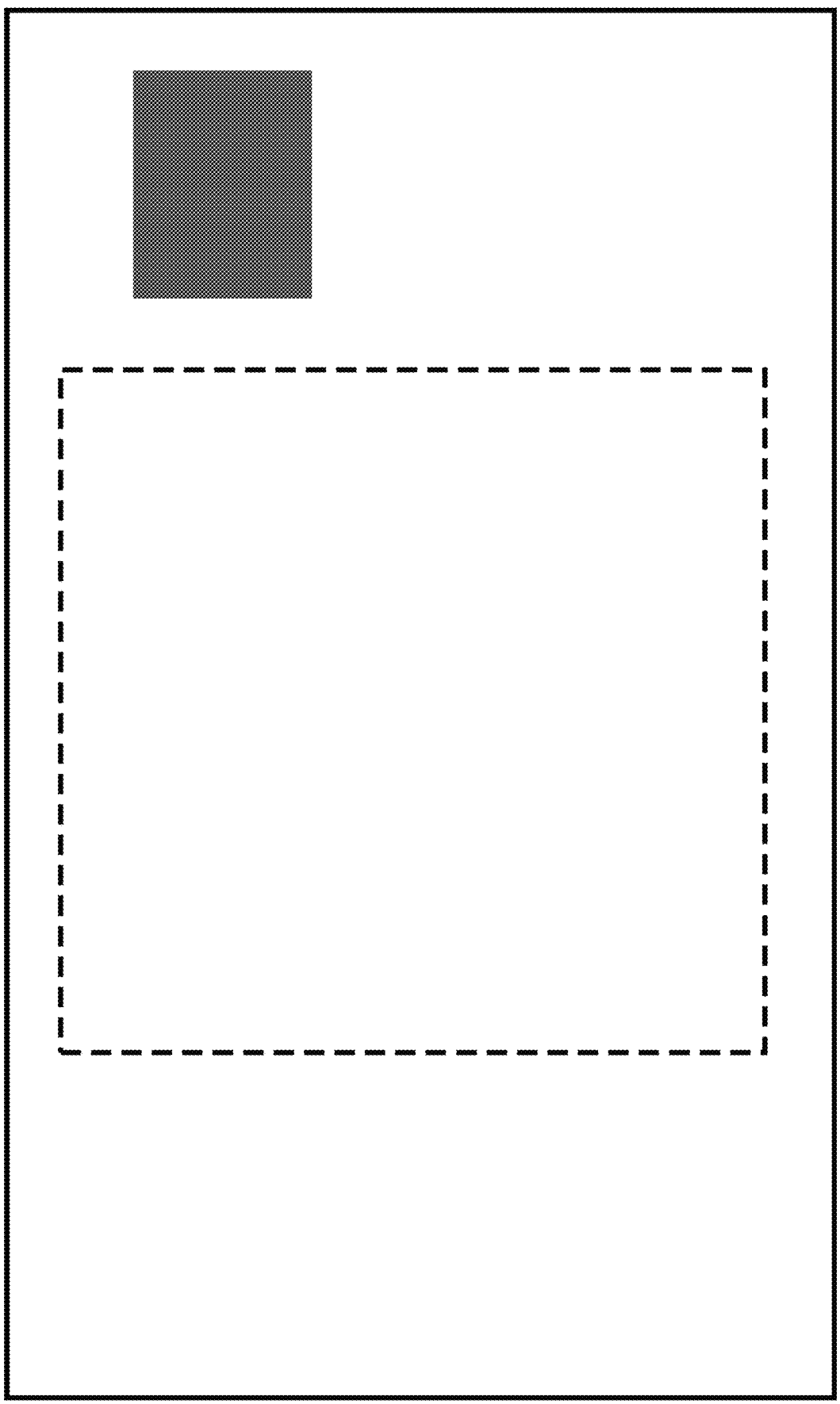
FIG. 6 shows a schematic diagram of the desktop in FIG. 5 in another state.

Referring to FIGS. 5 and 6, FIG. 5 is a schematic diagram of a desktop including a floating-window container provided by an embodiment of the present disclosure in a state, and FIG. 6 is a schematic diagram of the desktop in FIG. 5 in another state. In FIGS. 5 and 6, dashed boxes can represent interfaces currently exhibited in the desktop, and shaded boxes can represent floating-window containers added desktop elements. The region where the floating-window container in FIG. 5 is located may be the current region where the floating-window container is located. It can be seen from FIG. 5 that the floating-window container blocks the currently exhibited interface on the desktop, which will affect the user's viewing of the exhibited interface. Based on this, the exhibiting method of the desktop element according to the present disclosure can support the user to move the floating-window container to another region of the desktop through a gesture action, for example, to the region shown in FIG. 6 for exhibition.

In addition to the above-mentioned manual moving the floating-window container by the user, in some embodiments, the step can be: if determining the selected floating-window container to be located in the region of the current exhibition interface according to the regional position of the floating-window container and the regional position of the current exhibition interface in the desktop, the position of the floating-window container can be automatically adjusted adaptively, so as to prevent the floating-window container from blocking the contents in the currently exhibited interface.

Figure 7:
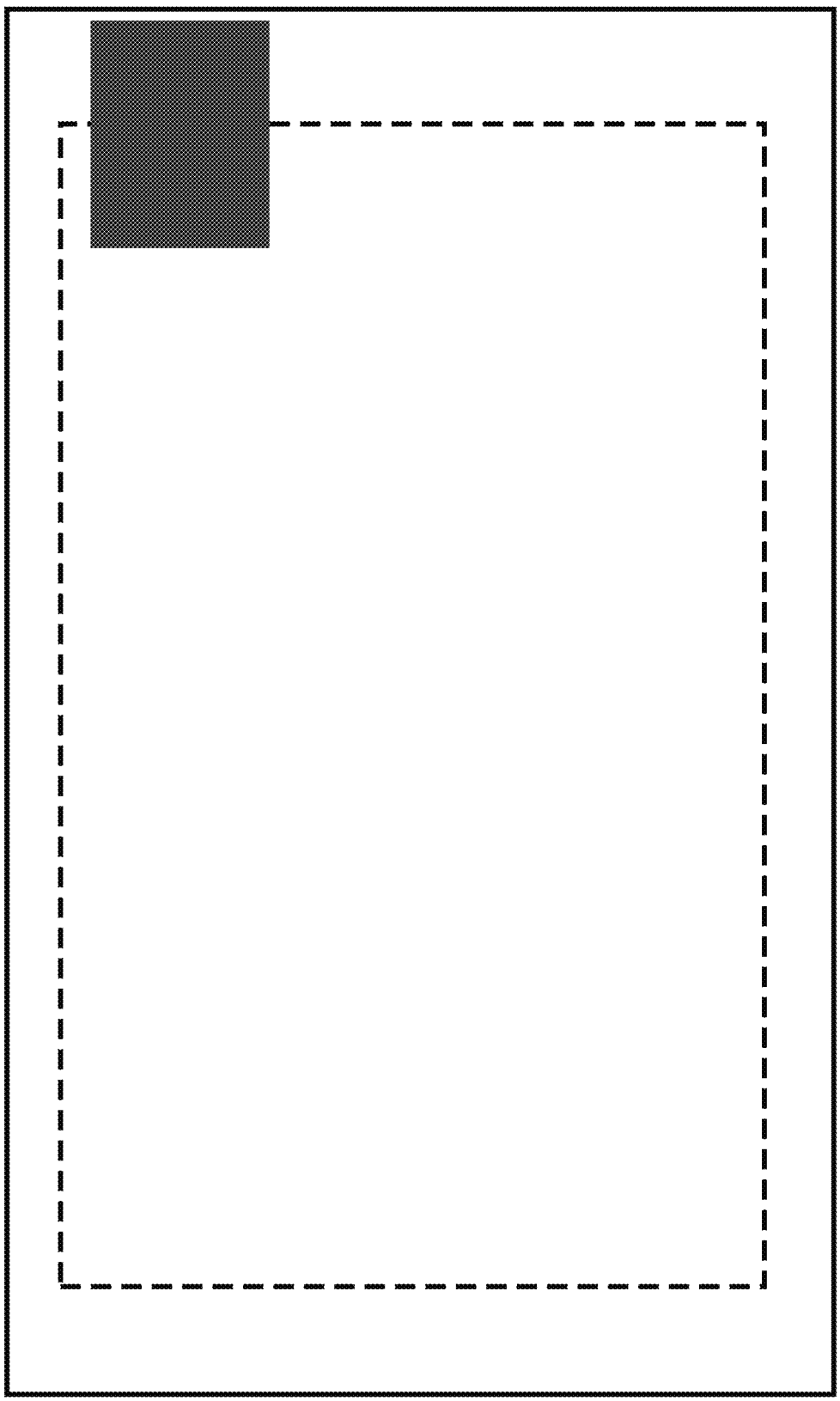
FIG. 7 shows a schematic diagram of a desktop including a floating-window container provided by another embodiment of the present disclosure in a state.
Figure 8:
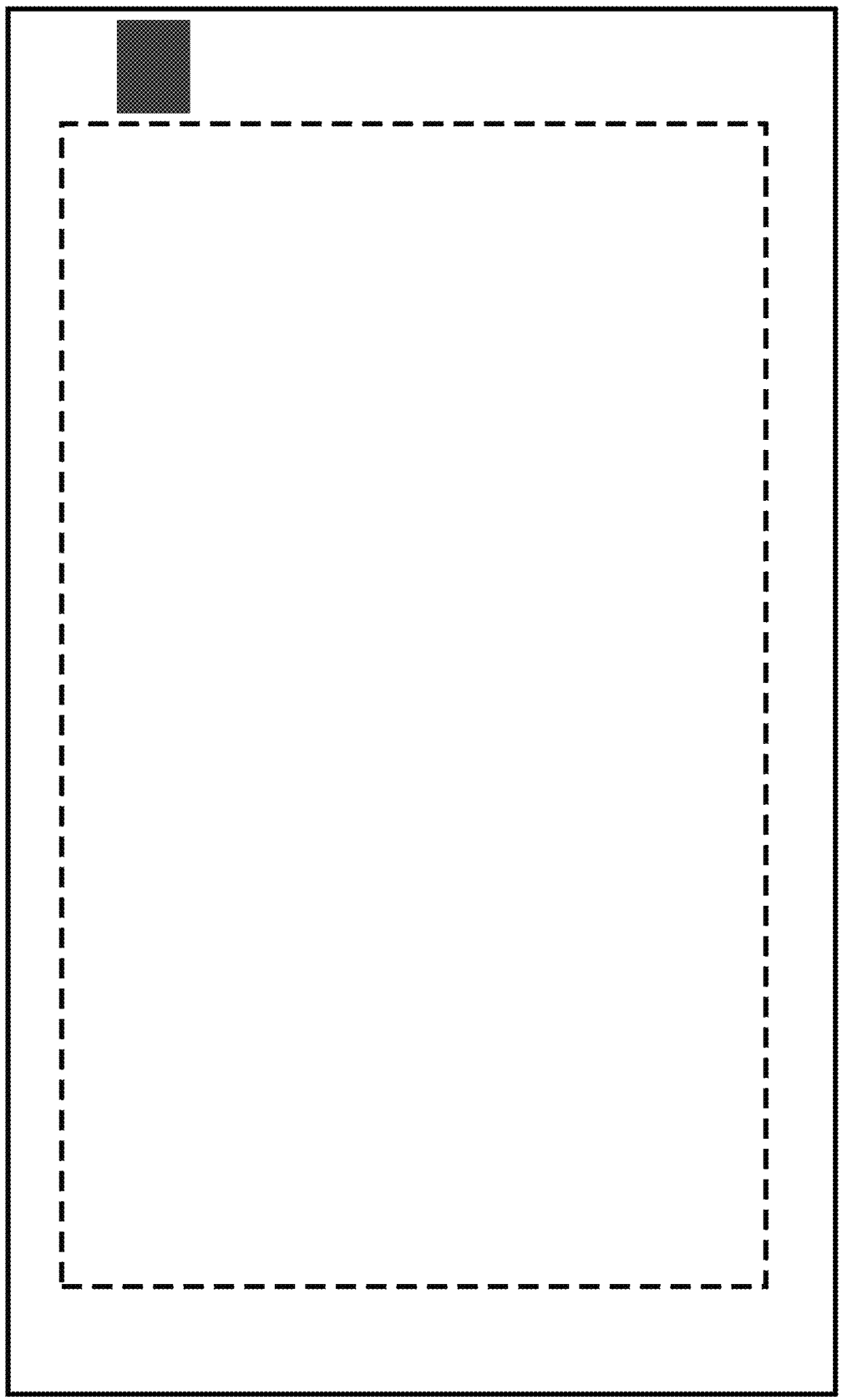
FIG. 8 shows a schematic diagram of the desktop in FIG. 7 in another state.

In some embodiments, after the desktop element is moved from the desktop to the floating-window container, a window size of the floating-window container may also be adjusted in response to the floating-window adjusting instruction, so as to adjust a size of the desktop element. Thereinto, the floating-window adjusting instruction may be generated when a window-size adjusting gesture for the floating-window container is sensed on the display screen. Referring to FIGS. 7 and 8, FIG. 7 is a schematic diagram of a desktop including a floating-window container provided by another embodiment of the present disclosure in a state, and FIG. 8 is a schematic diagram of the desktop in FIG. 7 in another state. In FIGS. 7 and 8, dashed boxes can represent interfaces currently exhibited in the desktop, and shaded boxes can represent the floating-window containers added desktop elements. It can be seen from FIG. 7 that the currently exhibited interface on the desktop occupies most of the region of the desktop, and the window of the floating-window container is too large to block a part of the currently exhibited interface. In this case, the user can adjust the size of the floating-window container through the window-size adjusting gesture, so as to prevent the floating-window container from blocking the currently exhibited interface on the desktop.

Figure 9:
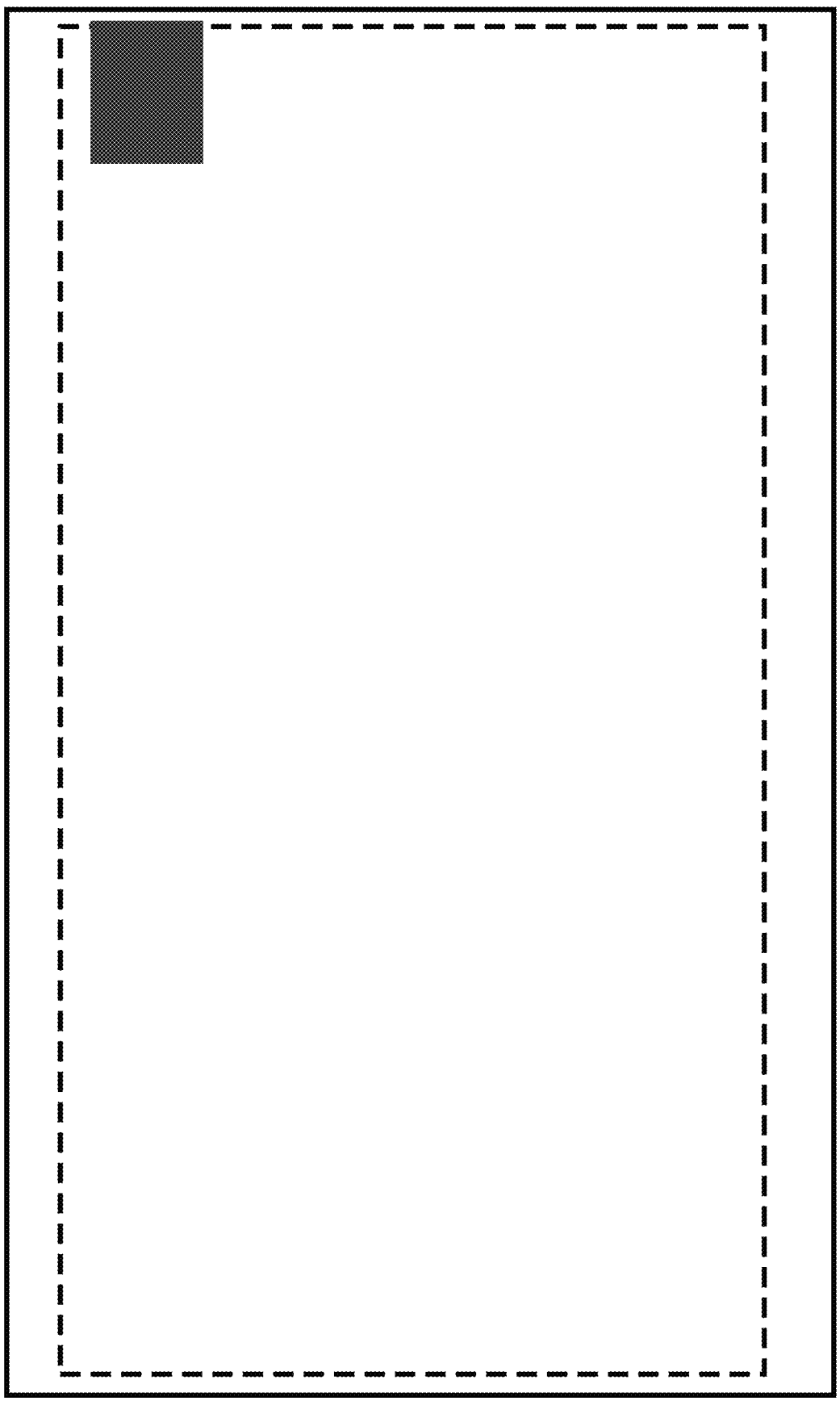
FIG. 9 shows a schematic diagram of a desktop including a floating-window container provided by another embodiment of the present disclosure in a state.
Figure 10:
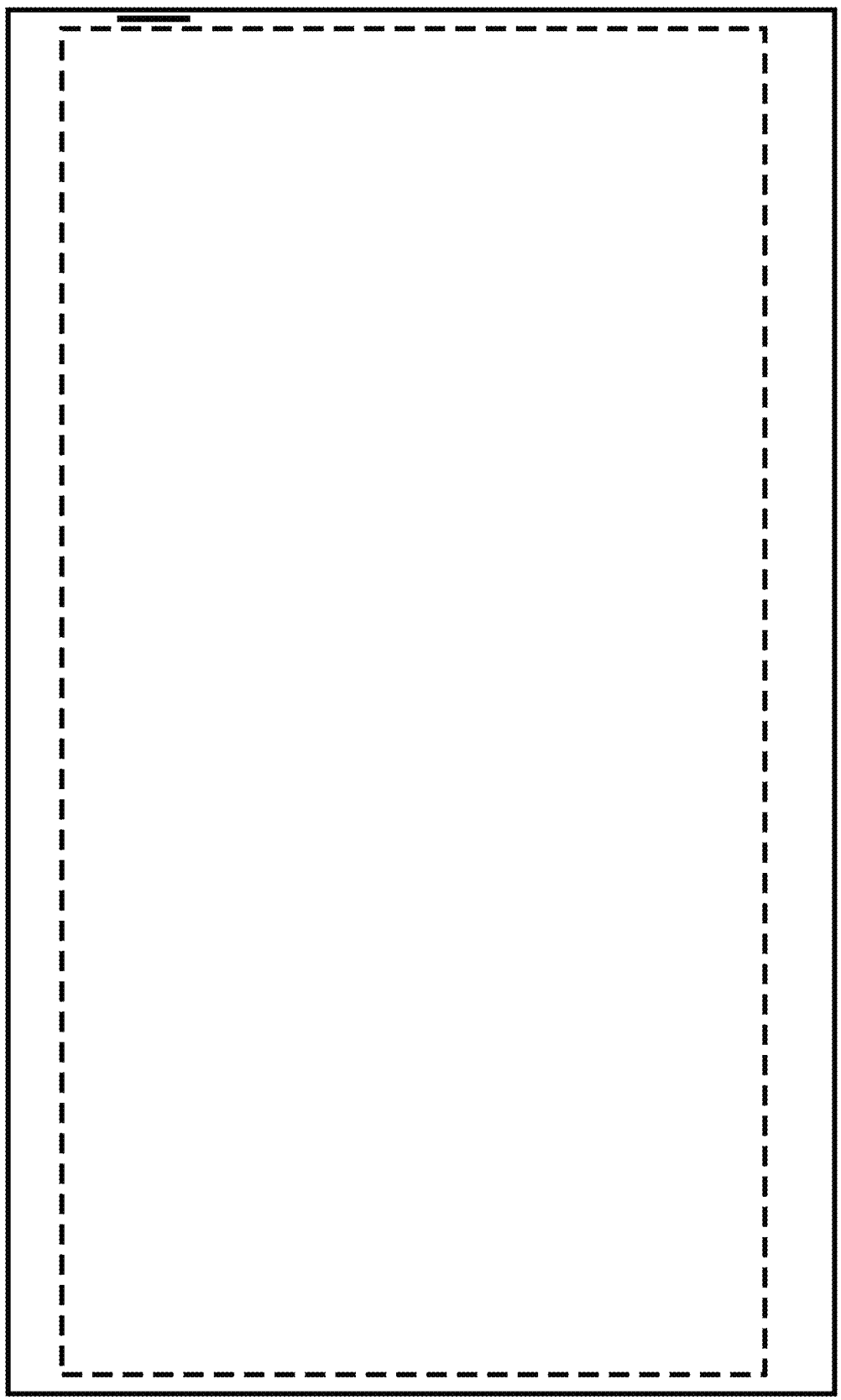
FIG. 10 shows a schematic diagram of the desktop in FIG. 9 in another state.

In some embodiments, the floating-window container may further include a normal display state and a minimization display state, wherein the normal display state refers to a state in which a window of the floating-window container is exhibited on the desktop, and the minimization display state refers to a state in which the floating-window container remains running, but its corresponding window is not exhibited on the desktop. Based on this, after the desktop element is moved from the desktop to the floating-window container, the floating-window container can also be adjusted from the normal display state to the minimization display state when receiving a minimization instruction or detecting that the current interface exhibited in the desktop is a preset interface. Thereinto, the minimization instruction may be generated when detecting that a minimization action for the floating-window container is performed. The minimization actions include but are not limited to preset gesture actions and mouse actions. And the preset interface may be a corresponding interface when the preset specified application is in a specified running state, for example, a corresponding interface when PowerPoint (PPT, which is a presentation software) is playing in full screen, or a game interface. Referring to FIGS. 9 and 10, FIG. 9 is a schematic diagram of a desktop including a floating-window container provided by another embodiment of the present disclosure in a state, and FIG. 10 is a schematic diagram of the desktop in FIG. 9 in another state. In FIGS. 9 and 10, dashed boxes can represent preset interfaces currently exhibited in the desktop, and shaded boxes can represent floating-window containers added desktop elements. As can be seen from FIGS. 9 and 10, when detecting that the current interface exhibited in the desktop is a preset interface, the floating-window container can be adjusted from the normal display state in FIG. 9 to the minimization display state in FIG. 10, so as to prevent the floating-window container from interfering and blocking contents in the preset interface.

In some embodiments, when detecting a window recovery instruction or a preset interface stopping exhibiting on the desktop, the floating-window container may be adjusted from the minimization display state to the normal display state, which facilitates the user to view or operate the desktop elements in the floating-window container.

In some embodiments, if receiving a floating-window closing instruction, the desktop element may be removed from the floating-window container and restored to the desktop, and the floating-window container may be deleted. Thus, the desktop element can be switched from the floating-window container to the desktop for display.

In some embodiments, when the desktop element is restored to the desktop, the desktop element can be restored to an initial position on the desktop. Thereinto, the initial position may refer to the regional position of the desktop element on the desktop before it is switched from the desktop to the floating-window container for exhibition. Thus, after the desktop element is restored to the desktop, it is convenient for the user to find the restored desktop element on the desktop based on the initial position of the desktop element.

It can be understood that in some embodiments, the floating-window container may also be randomly restored to a free regional position on the desktop. Thereinto, the free regional position refers to a region where there is no content on the desktop. Thus, the determining processing logic is reduced, and the implementation approach of the solution is easier.

In some embodiments, based on the creating flow of the floating-window container in FIG. 3, the desktop coordinate of the desktop element can be stored as the element desktop coordinates before moving the desktop element from the desktop to the floating-window container. Then, when restoring the desktop element to the desktop, it can determine whether there is a content in the regional position defined by the element desktop coordinate. If not, the desktop element is restored to the regional position defined by the element desktop coordinates. If there is a content in the regional position defined by the element desktop coordinate, the desktop element is restored to a free regional position of the desktop. Thus, that the following situation can be avoided: when the desktop element is switched to the floating-window container for display, the initial position of the desktop element on the desktop is occupied by other contents (such as application icons), thus when the desktop element is restored to the desktop, it overlaps with other contents.

In some embodiments, after the desktop element is restored to the regional position defined by the element desktop coordinate, if a size of the desktop element is different from that of the regional position defined by the element desktop coordinate, the size of the desktop element is adjusted so that the size of the desktop element matches that of the regional position defined by the desktop coordinates. In some implementations, for example, in the scenarios shown in FIGS. 7 and 8, the size of the desktop element may be adjusted during the process of displaying the desktop element through the floating-window container.

Figure 11:
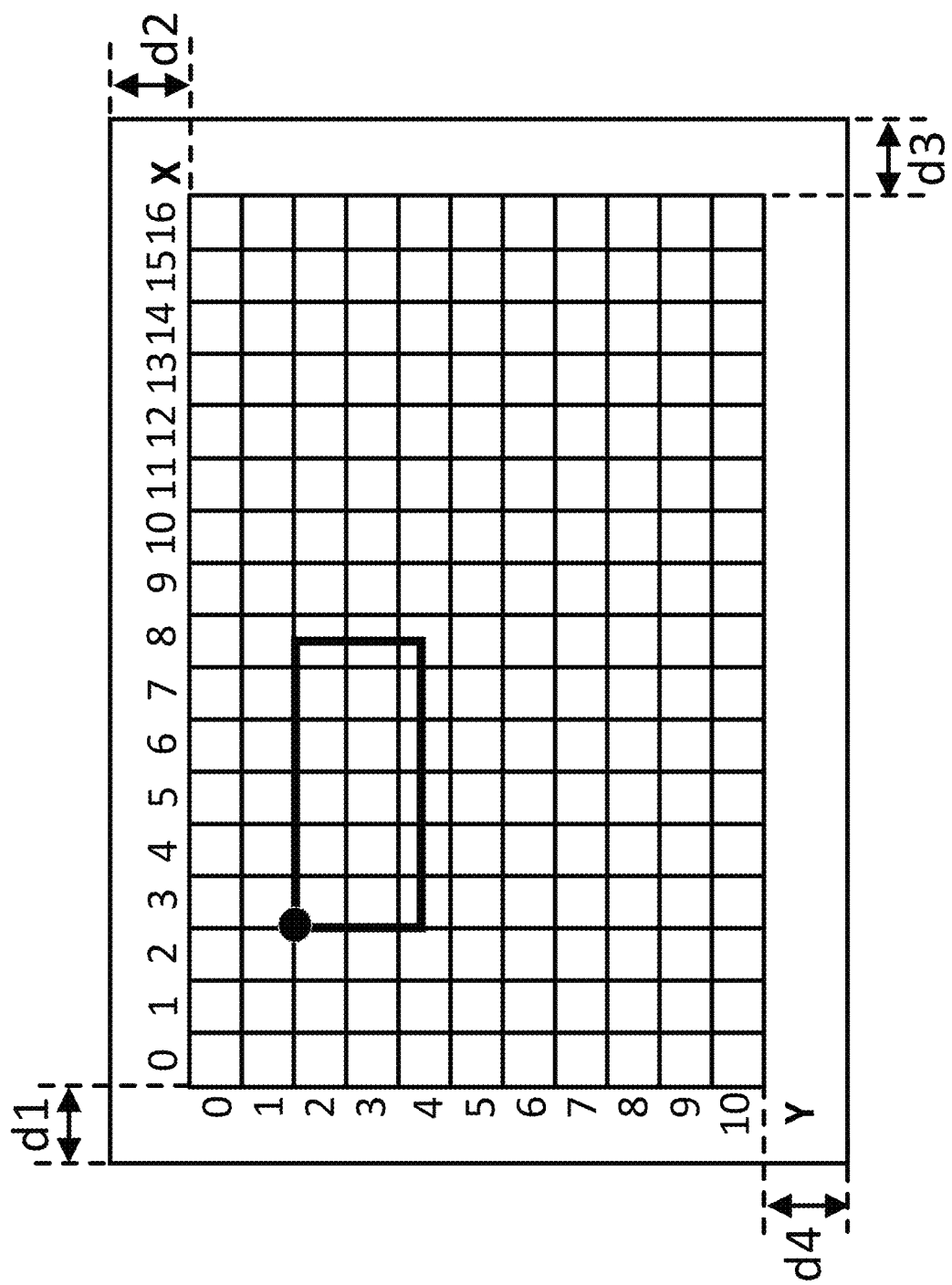
FIG. 11 shows a schematic diagram after a desktop element is restored to the desktop provided by an embodiment of the present disclosure.

After being restored to the desktop, the desktop element may not occupy a complete grid under the grid coordinate system of the desktop. Referring to FIGS. 4 and 11 for details, FIG. 11 is a schematic diagram after a desktop element is restored to the desktop provided by an embodiment of the present disclosure. As can be seen from FIGS. 4 and 11, on the one hand, since the size of the desktop element has been adjusted in the floating-window container, the number of grids occupied by the desktop element, after the desktop element is restored to the desktop, is significantly reduced compared to the initial desktop element on the desktop (as shown in FIG. 4). The size of the desktop element changes, which may bring bad experience to users. On the other hand, the right side edge and the bottom edge of the desktop element are located in the middle of the grid and do not occupy a complete grid, which is not convenient for coordinate calculation under the desktop coordinate system (referring to the relative description of FIG. 4 for details). Therefore, after restoring the desktop element to the desktop, the size of the desktop element is adjusted so as to match the size of the regional position defined by the desktop coordinate, which can improve the user experience and facilitate coordinate calculation under the desktop coordinate system.

In some embodiments of the present disclosure, based on the set-to-top instruction, the desktop element can be added to the floating-window container, so that the desktop element is displayed on the upper layer of each interface. Based on the floating-window closing instruction, the desktop element can be removed from the floating-window container, so that the desktop element can be displayed on the desktop. In some implementations, when there are other exhibition interfaces (such as PPT exhibition interfaces) on the desktop, the desktop elements can be located on the upper layer of other interfaces through the floating-window container. Therefore, the user can view or operate the desktop element without closing or minimizing other display interfaces, which facilitates the user's operations. When other exhibition interfaces are closed or minimized, the desktop elements can be restored to the desktop for exhibition, so as to facilitate the management of desktop elements.

A specific application scenario is taken as an example to describe the exhibiting method of the desktop element according to the present disclosure. Herein, it is assumed that the desktop element is used to exhibit a desktop clock tool. When performing PPT exhibition on the desktop, the user can control the desktop elements to be exhibited on the upper layer of the PPT interface through the set-to-top instruction. Thus, the user can view the time displayed by the desktop clock tool without closing or minimizing the PPT interface, which facilitates the operation. When the user completes the PPT exhibition, the desktop element can be restored to the desktop for exhibition through the floating-window closing instruction, which facilitates the management of desktop elements and makes the desktop more beautiful.

Figure 12:
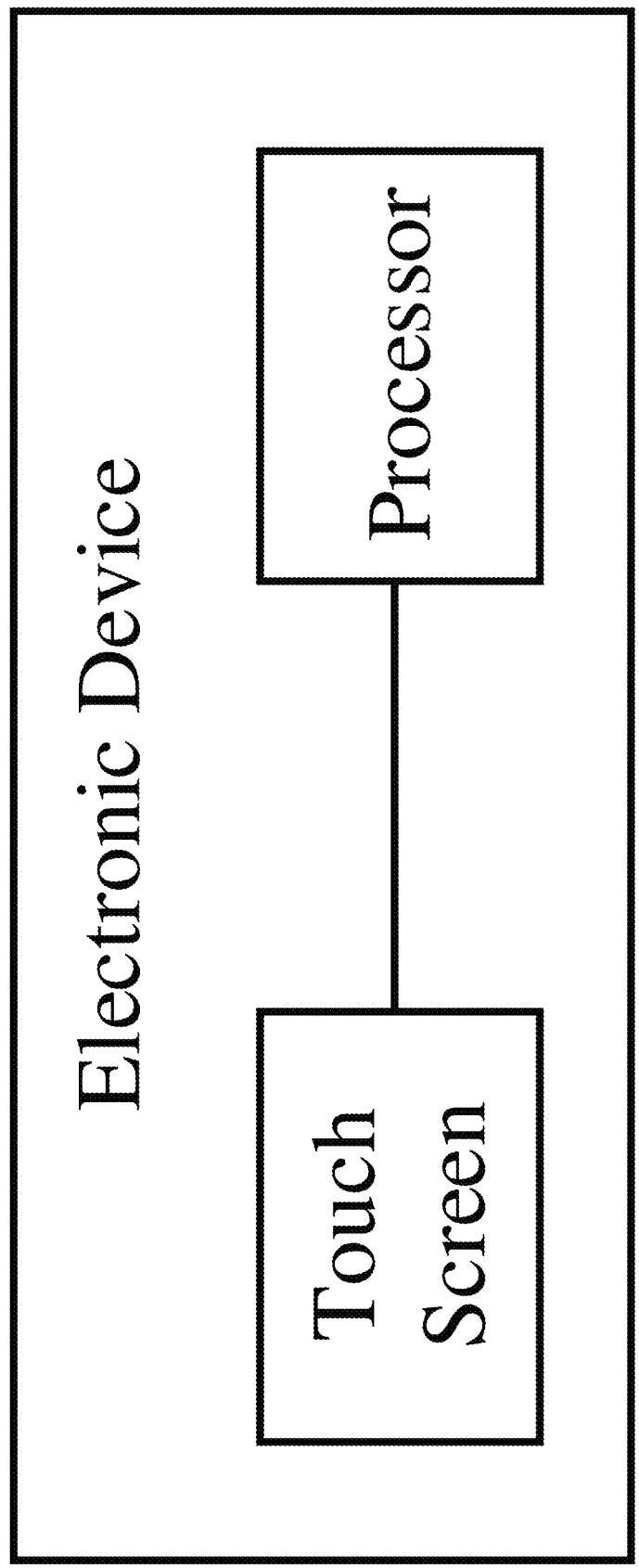
FIG. 12 is a schematic diagram of modules of an electronic device provided by an embodiment of the present disclosure.

Referring to FIG. 12, FIG. 12 is a schematic diagram of modules of an electronic device provided by an embodiment of the present disclosure. The electronic device is provided with an operating system, and a desktop of the operating system includes a desktop element. The electronic device includes: a touch screen, configured to exhibit the desktop and receive a set-to-top instruction directed at the desktop element; and a processor, configured to create a floating-window container for the desktop element according to the set-to-top instruction, move the desktop element from the desktop to the floating-window container, and locate the desktop element exhibited in the floating-window container on an upper layer of an interface exhibited in the desktop.

It should be noted that, in some embodiments, in addition to the above operations, the processor may further perform other operation steps in the above exhibiting method. For example, when receiving a floating-window closing instruction, the processor removes the desktop element from the floating-window container, and restores the desktop element to the desktop.

Figure 13:
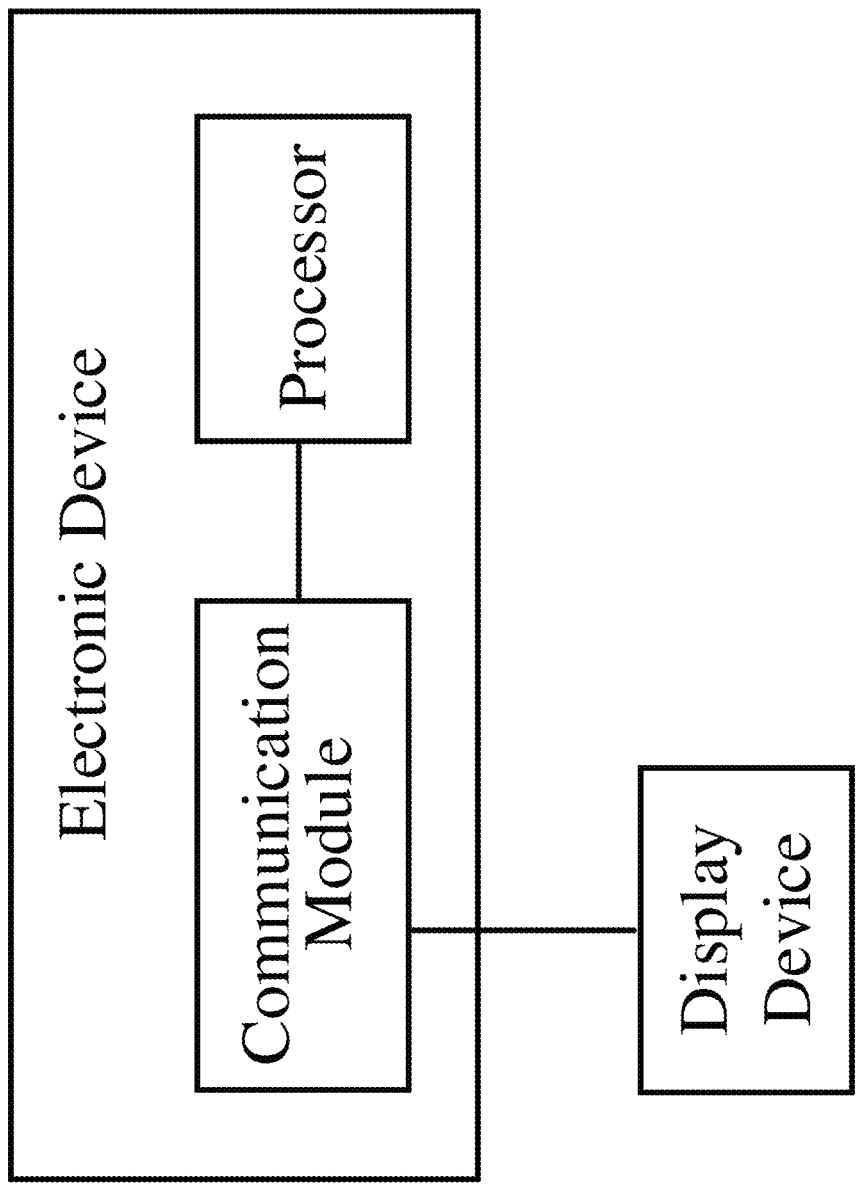
FIG. 13 shows a schematic diagram of modules of an electronic device provided by another embodiment of the present disclosure.

Referring to FIG. 13, FIG. 13 is a schematic diagram of modules of an electronic device provided by another embodiment of the present disclosure. The electronic device is connected with a display device, the electronic device is provided with an operating system, a desktop of the operating system includes a desktop element, and a desktop of the operating system is exhibited by the display device. The electronic device includes: a communication module, configured to communicate with the display device and receive a set-to-top instruction directed at the desktop element sent by the display device; and a processor, configured to generate a control instruction according to the set-to-top instruction, send the control instruction to the display device through the communication module, so as to control the display device to create a floating-window container for the desktop element, move the desktop element from the desktop to the floating-window container, and locate the desktop element exhibited in the floating-window container on an upper layer of an interface exhibited in the desktop.

It should be noted that, in some embodiments, in addition to the above operations, the processor may further perform other operation steps in the above exhibiting method. For example, when the communication module receives a floating-window closing instruction sent by the display device, the processor may generate the floating-window removing instruction and send the generated floating-window removing instruction to the display device through the communication module, so as to control the display device to remove the desktop element from the floating-window container and restore the desktop element to the desktop.

In practical application, the electronic device shown in FIG. 13 may be, for example, an intelligent audio device. An operating system can be installed in the intelligent audio device, and the operating system can realize the above function of exhibiting the desktop element through a floating window. Generally, in order to simplify a hardware structure of the intelligent audio device, the intelligent audio device is often not equipped with the display screen. When using the intelligent audio device, the communication connection between the intelligent audio device and the external display device can be established through the communication module built in the intelligent audio device. The display device can be a touch display screen, and can receive the set-to-top instruction directed at the desktop element from the user, and the set-to-top instruction will be sent by the display device to the intelligent audio device. Subsequently, the intelligent audio device can perform set-to-top exhibition of the desktop element through the created floating-window container according to the set-to-top instruction.

Figure 14:
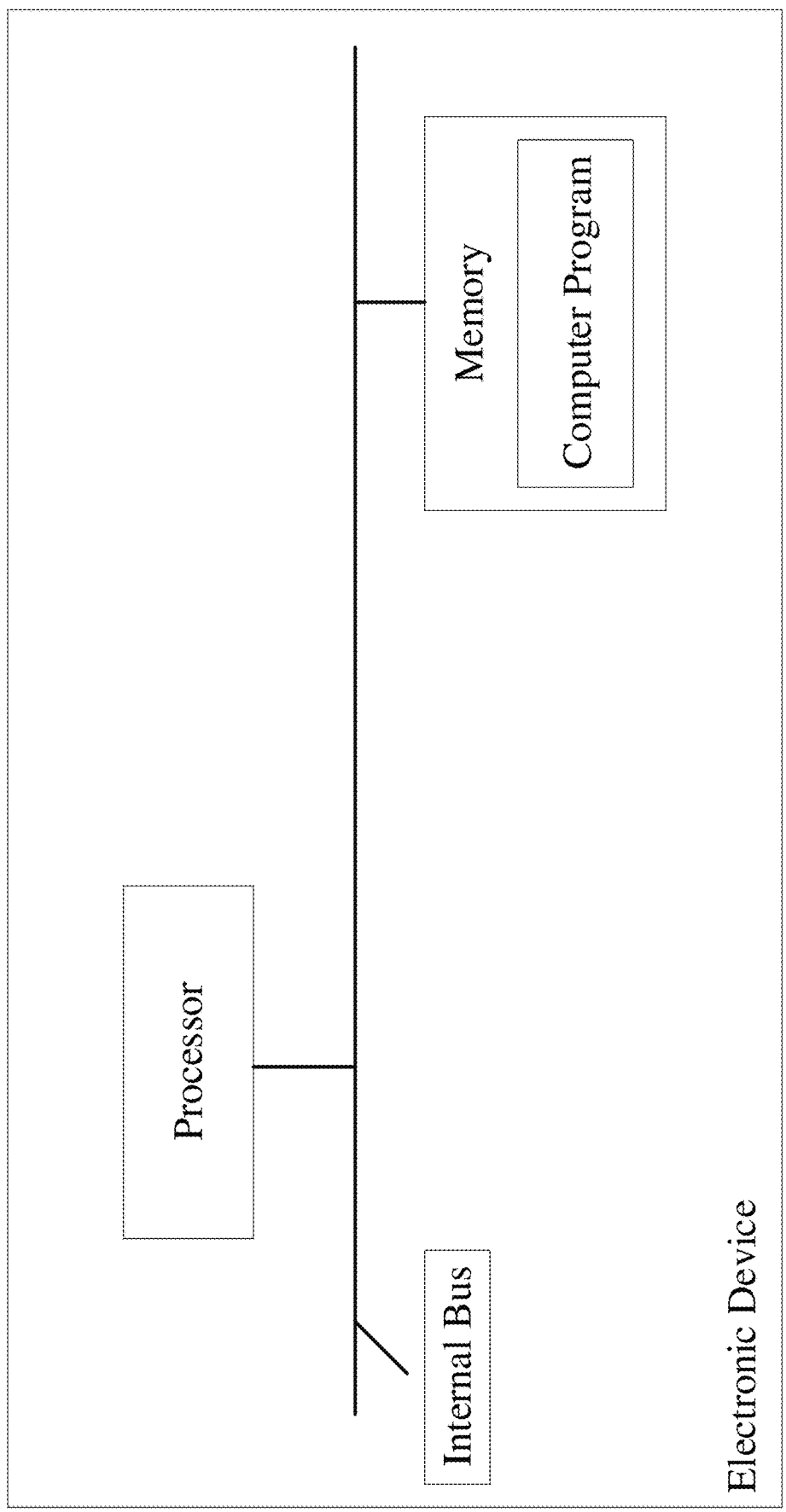
FIG. 14 shows a schematic diagram of an electronic device provided by another embodiment of the present disclosure.

Referring to FIG. 14, FIG. 14 is a schematic diagram of an electronic device provided by another embodiment of the present disclosure. The electronic device includes a processor and a memory, the memory is configured to store a computer program, and when the computer program is executed by the processor, the exhibiting method of the desktop element described above is realized.

Thereinto, the processor may be a Central Processing Unit (CPU). The processor may also be other general-purpose processor, Digital Signal Processor (DSP), Application Specific Integrated Circuit (ASIC), Field Programmable Gate Array (FPGA) or other programmable logic devices, discrete gate or transistor logic devices, discrete hardware components and other chips, or combinations of the above types of chips.

As a non-transitory computer readable storage medium, the memory can be configured to store non-transitory software programs, non-transitory computer executable programs and modules, such as program instructions/modules corresponding to the method in the embodiment of the present disclosure. The processor executes various functional applications and data processing of the processor by executing non-transient software programs, instructions and modules stored in the memory, that is, the method in the above described method embodiment is realized.

The memory may include a program storage region and a data storage region, wherein the program storage region may store an operating system and an application program required for at least one function, and the data storage region may store data created by the processor and the like. In addition, the memory may include a high-speed random access memory, and may also include a non-transitory memory, such as at least one disk storage device, a flash memory device, or other non-transitory solid-state storage device. In some embodiments, the memory may optionally include memory remotely arranged relative to the processor, which may be connected with the processor through a network. Examples of the above networks include but are not limited to the Internet, an enterprise intranet, a local region network, a mobile communication network, and combinations thereof.

An embodiment of the present disclosure further provides a computer-readable storage medium. The computer-readable storage medium is configured to store a computer program. When the computer program is executed by a processor, the exhibiting method of the desktop element described above is realized.

Although the embodiments of the present disclosure have been described in conjunction with the drawings, those skilled in the art may make various modifications and variations without departing from the spirit and scope of the present disclosure, and such modifications and variations fall within the scope defined by the appended claims.

What is claimed is:

1. A display method of a desktop element, wherein the method is performed by an operating system of an interactive white board, and a desktop of the operating system comprises the desktop element, the method comprising:
   receiving a pin-to-top instruction directed at the desktop element;
   creating a floating window for the desktop element according to the pin-to-top instruction;
   moving the desktop element from the desktop to the floating window by selecting the desktop element exhibited on the desktop through touch or long press applied to the desktop element so that the selected desktop element is automatically moved to the floating window;
   locating the desktop element displayed in the floating window on an upper layer of an interface displayed in the desktop; and
   in response to determining that the floating window being located in a region blocking an exhibit interface in the desktop of the interactive white board, automatically adjusting a position of the floating window adaptively to prevent the floating window from blocking the exhibit interface, wherein the exhibit interface comprises an interface of a presentation software,
   wherein the desktop element comprises at least one object that is operable in the floating window in response to a user input, wherein the object comprises at least one of an application icon or a display interface of a desktop tool for the interactive white board.

2. The method according to claim 1, wherein creating the floating window for the desktop element comprises:
   determining a desktop coordinate of the desktop element, wherein the desktop coordinate refers to a coordinate position of the desktop element under a grid coordinate system of the desktop, and the grid coordinate system is established based on a grid matrix of the desktop;
   converting the desktop coordinate of the desktop element into a screen coordinate, wherein the screen coordinate refers to a coordinate position of the desktop element under a screen coordinate system of the desktop, and the screen coordinate system is established based on a screen resolution; and
   creating the floating window in a region defined by the screen coordinate.

3. The method according to claim 1, wherein after creating the floating window, the method further comprises:
   when a floating-window closing instruction is received, removing the desktop element from the floating window and restoring the desktop element to an initial position on the desktop.

4. The method according to claim 3, wherein before moving the desktop element from the desktop to the floating window, the method further comprises:
   storing a desktop coordinate of the desktop element as an element desktop coordinate;
   wherein restoring the desktop element to the desktop comprises:
   upon determining that there is no content in the region defined by the element desktop coordinate, restoring the desktop element to the region defined by the element desktop coordinate.

5. The method according to claim 4, further comprising:
   upon determining that there is a content in the region defined by the element desktop coordinate, restoring the desktop element to a free region on the desktop.

6. The method according to claim 4, wherein after restoring the desktop element to the region defined by the element desktop coordinate, the method further comprises:
   when a size of the desktop element is different from that of the region defined by the element desktop coordinate, adjusting the size of the desktop element, so that the size of the desktop element matches the size of the region defined by the element desktop coordinate.

7. The method according to claim 1, wherein after moving the desktop element from the desktop to the floating window, the method further comprises:
   in response to a floating-window adjusting instruction, adjusting a window size of the floating window so as to adjust the size of the desktop element; or
   in response to a window moving instruction, moving the floating window from a current region to another region of the desktop so as to display the desktop element in the another region.

8. The method according to claim 1, wherein the floating window comprises a normal display state and a minimization display state, wherein the normal display state refers to a state in which a window of the floating window is displayed on the desktop, and the minimization display state refers to a state in which the floating window remains running but the corresponding window is not displayed on the desktop; and after moving the desktop element from the desktop to the floating window, the method further comprises:

when a minimization instruction is received or detecting that a current interface displayed in the desktop is a preset interface, adjusting the floating window from the normal display state to the minimization display state, and when detecting a window recovery instruction or that the preset interface stops exhibiting on the desktop, adjusting the floating window from the minimization display state to the normal display state.

9. The method according to claim 1, wherein the floating window is created by selecting the desktop element exhibited on the desktop through touch or long press applied to the desktop element and the selected desktop element is automatically moved to the floating window after creating the floating window.

10. An electronic device, wherein the electronic device is provided with an operating system, and a desktop of the operating system comprises a desktop element, the electronic device comprises:

an interactive white board, comprising:

a touch screen, configured to display the desktop and receive a pin-to-top instruction directed at the desktop element; and a processor coupled to the touch screen, and configured to:

create a floating window for the desktop element according to the pin-to-top instruction, move the desktop element from the desktop to the floating window by selecting the desktop element exhibited on the desktop through touch or long press applied to the desktop element so that the selected desktop element is automatically moved to the floating window, locate the desktop element displayed in the floating window on an upper layer of an interface displayed in the desktop, and in response to determining that the floating window being located in a region blocking an exhibit interface in the desktop of the interactive white board, automatically adjust a position of the floating window adaptively to prevent the floating window from blocking the exhibit interface, wherein the exhibit interface comprises an interface of a presentation software, wherein the desktop element comprises at least one object that is operable in the floating window in response to a user input, wherein the object comprises at least one of an application icon or a display interface of a desktop tool for the interactive white board.

11. The electronic device according to claim 10, wherein the processor configured to create the floating window for the desktop element is further configured to:

determine a desktop coordinate of the desktop element, wherein the desktop coordinate refers to a coordinate position of the desktop element under a grid coordinate system of the desktop, and the grid coordinate system is established based on a grid matrix of the desktop;

convert the desktop coordinate of the desktop element into a screen coordinate, wherein the screen coordinate refers to a coordinate position of the desktop element under a screen coordinate system of the desktop, and the screen coordinate system is established based on a screen resolution; and create the floating window in a region defined by the screen coordinate.

12. The electronic device according to claim 10, wherein after creating the floating window, the processor is further configured to:

when a floating-window closing instruction is received, remove the desktop element from the floating window and restore the desktop element to an initial position of the desktop.

13. The electronic device according to claim 12, wherein before moving the desktop element from the desktop to the floating window, the processor is further configured to:

store a desktop coordinate of the desktop element as an element desktop coordinate;

wherein the processor configured to restore the desktop element to the desktop is further configured to:

upon determining that there is not a content in the region defined by the element desktop coordinate, restore the desktop element to the region defined by the element desktop coordinate.

14. The electronic device according to claim 13, wherein the processor is further configured to:

upon determining that there is a content in the region defined by the element desktop coordinate, restore the desktop element to a free region on the desktop.

15. The electronic device according to claim 13, wherein after restoring the desktop element to the region defined by the element desktop coordinate, the processor is further configured to:

when a size of the desktop element is different from that of the region defined by the element desktop coordinate, adjust the size of the desktop element, so that the size of the desktop element matches the size of the region defined by the element desktop coordinate.

16. The electronic device according to claim 10, wherein after moving the desktop element from the desktop to the floating window, the processor is further configured to:

in response to a floating-window adjusting instruction, adjust a window size of the floating window so as to adjust the size of the desktop element; or in response to a window moving instruction, move the floating window from a current region to another region of the desktop so as to display the desktop element in the another region.

17. The electronic device according to claim 10, wherein the floating window comprises a normal display state and a minimization display state, wherein the normal display state refers to a state in which a window of the floating window is displayed on the desktop, and the minimization display state refers to a state in which the floating window remains running but the corresponding window is not displayed on the desktop; and after moving the desktop element from the desktop to the floating window, the processor is further configured to:

when a minimization instruction is received or detecting that a current interface displayed in the desktop is a preset interface, adjust the floating window from the normal display state to the minimization display state, and when detecting a window recovery instruction or that the preset interface stops exhibiting on the desktop, adjust the floating window from the minimization display state to the normal display state.

18. An electronic device, wherein the electronic device comprises an interactive white board, the electronic device is provided with an operating system, a desktop of the operating system comprises a desktop element and is displayed by the interactive white board, the electronic device comprising:

a memory storing computer-readable instructions; and a processor coupled to the memory and configured to execute the computer-readable instructions, wherein the computer-readable instructions, when executed by the processor, cause the processor to perform operations comprising:

receiving a pin-to-top instruction directed at the desktop element;

creating a floating window for the desktop element according to the pin-to-top instruction;

moving the desktop element from the desktop to the floating window by selecting the desktop element exhibited on the desktop through touch or long press applied to the desktop element so that the selected desktop element is automatically moved to the floating window;

locating the desktop element displayed in the floating window on an upper layer of an interface displayed in the desktop; and in response to determining that the floating window being located in a region blocking an exhibit interface in the desktop of the interactive white board, automatically adjusting a position of the floating window adaptively to prevent the floating window from blocking the exhibit interface, wherein the exhibit interface comprises an interface of a presentation software, wherein the desktop element comprises at least one object that is operable in the floating window in response to a user input, wherein the object comprises at least one of an application icon or a display interface of a desktop tool for the interactive white board.

19. The electronic device according to claim 18, wherein creating the floating window for the desktop element comprises:

determining a desktop coordinate of the desktop element, wherein the desktop coordinate refers to a coordinate position of the desktop element under a grid coordinate system of the desktop, and the grid coordinate system is established based on a grid matrix of the desktop;

converting the desktop coordinate of the desktop element into a screen coordinate, wherein the screen coordinate refers to a coordinate position of the desktop element under a screen coordinate system of the desktop, and the screen coordinate system is established based on a screen resolution; and creating the floating window in a region defined by the screen coordinate.

20. The electronic device according to claim 18, wherein after creating the floating window, the operations further comprise:

when a floating-window closing instruction is received, removing the desktop element from the floating window and restoring the desktop element to an initial position of the desktop, wherein before moving the desktop element from the desktop to the floating window, the operations further comprise:

storing a desktop coordinate of the desktop element as an element desktop coordinate;

wherein restoring the desktop element to the desktop comprises:

upon determining that there is not a content in the region defined by the element desktop coordinate, restoring the desktop element to the region defined by the element desktop coordinate.

* * * * *